United States Patent [19]

Smith

[11] Patent Number: 4,600,170
[45] Date of Patent: Jul. 15, 1986

[54] TANDEM SEAT FOR ULTRA LIGHT AIRCRAFT

[76] Inventor: Terry L. Smith, 18030 Balfern Ave., Bellflower, Calif. 90706

[21] Appl. No.: 542,403

[22] Filed: Oct. 17, 1983

Related U.S. Application Data

[63] Continuation-in-part of Ser. No. 401,073, Jul. 23, 1982, abandoned.

[51] Int. Cl.⁴ .............................................. B64D 11/06
[52] U.S. Cl. ....................... 244/122 R; 244/DIG. 1.4
[58] Field of Search .................... 244/233, 229, 122 R, 244/118.6, DIG. 1; 297/92-93, 243, 287; 296/63

[56] References Cited

U.S. PATENT DOCUMENTS

| 1,174,679 | 3/1916 | Carroll | 244/233 |
| 1,343,850 | 6/1920 | Roe | 244/229 |
| 1,350,266 | 8/1920 | Roe | 244/122 R |
| 2,516,352 | 7/1950 | Stewart | 297/243 |
| 3,269,773 | 8/1966 | O'Connor | 297/243 |

FOREIGN PATENT DOCUMENTS 106116  5/1917 United Kingdom ................ 244/229

OTHER PUBLICATIONS

Markowski, *Ultralight Aircraft*, Weed Hopper, pp. 138-141.

Primary Examiner—Galen L. Barefoot
Attorney, Agent, or Firm—Howard A. Kenyon

[57] ABSTRACT

A tandem seat assembly for ultra light aircraft is disclosed which is interchangeable with a single seat configuration. The assembly, which is primarily used for pilot training, is fitted with dual aircraft controls. The single seat must be removable from an ultra light aircraft in order for the tandem seat assembly as described by this invention to be utilized. The tandem seat assembly is thereby placed in the aircraft such that the center of gravity of the seat assembly is near the nominal center of gravity of the aircraft. Universal attachments of the seat assembly to the aircraft frame allow the seat assembly to be used with a number of different manufacturers of ultra light aircraft models.

7 Claims, 7 Drawing Figures

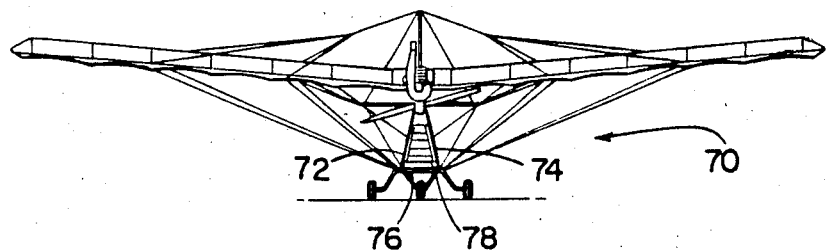
FIG. 4
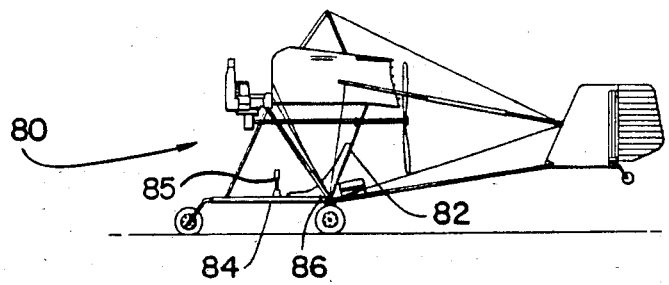
FIG. 5
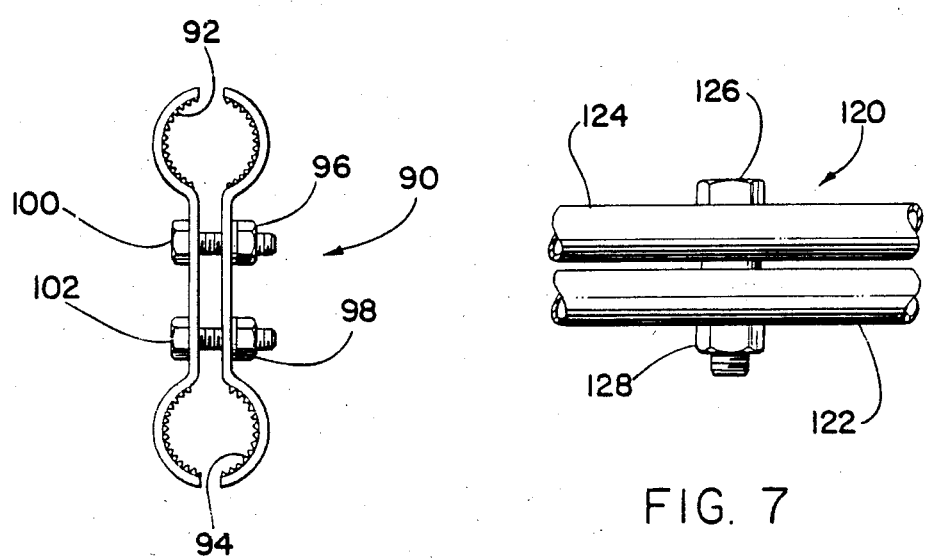
FIG. 6
FIG. 7

TANDEM SEAT FOR ULTRA LIGHT AIRCRAFT

CROSS REFERENCE TO RELATED APPLICATION

This application is a continuation-in-part of application Ser. No. 401,073 filed July 23, 1982, now abandoned.

BACKGROUND OF THE INVENTION

1. Field of Invention

This invention relates to a tandem seat assembly for an ultra light aircraft which generally has an empty weight of less than 254 pounds.

2. Description of Prior Art

Ultra light aircraft, which are not certified by the Federal Aviation Administration, are a class of aircraft which evolved from the hang glider. The hang glider is a non-powered ultra light glider that is controlled by one person shifting his weight in a type of harness or support suspended beneath the glider. An ultra light aircraft is essentially a hang glider in which a seat and landing gear replaces the harness. Also, a small engine and propeller have been added to provide a propulsive force, along with rudimentary aircraft and engine controls. Ultra light aircraft are used for sport and recreational purposes only.

However, since an ultra light aircraft has only one seat, all flight training must be performed on the ground. Many persons now flying ultra lights do not have any hang glider or aircraft flying experience. Instead they must rely solely on ground training, wherein the first flight is a solo flight. This creates a great danger to the pilot and others and can damage the aircraft as well as property on the ground.

Several attempts have been made to provide ultra light flight training. However, all prior designs involve a specific training aircraft with side by side seating. The known manufacturers of these side by side seating aircraft are Hummingbird, Rotec Engineering Inc. and Eipper. The side by side seating has proved to be less than successful due to the high drag caused by increased frontal area in addition to lateral instability resulting when only one person attempts to fly the aircraft.

The Army is presently evaluating a two seat ultra light aircraft in a side by side configuration. The present invention would give the Army a low drag configuration for dual seat operation. The Army's projected use is for surveillance, parachuting, mapping and flight training.

The construction of an ultra light aircraft requires a modern vehicle that is unlike conventional aircraft. The ultra light aircraft is normally constructed entirely of welded tubes or metalic members generally of high strength light weight steel that is usually welded together to form load carrying structures. Ultra light aircraft fuselages have no covering or skin, which exposes the pilot creating drag. Only the wings and tail surfaces are covered. Every attempt is made to save weight and minimize drag. Therefore, the largest drag item is the frontal area of the pilot.

Side by side seating produces large amount of drag since it is the frontal area of two pilots. In addition, it would be totally impractical to convert a single seat aircraft into a side by side for training purposes. It would require an engine substantially more powerful and a resulting weight increase to overcome the increased drag. However, a tandem seat for an ultra light aircraft will produce about the same frontal area drag as a single seat ultra light aircraft and require about the same power for flight.

It should be noted that since there is no skin or covering on the aircraft, all of the load is carried by the tubular members.

The single seat of an ultra light aircraft is usually made removable for maintenance and is not a load carrying member. Therefore, the present invention is limited to ultra light aircraft construction that allows the removal of a single seat without disrupting the integrity of load carrying members.

The novel features which are believed to be characteristics of the invention, both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

SUMMARY OF THE INVENTION

It is the object of this invention to provide a tandem seat assembly for an ultra light aircraft.

It is another object of this invention to provide a tandem seat assembly with a dual partial aerodynamic control system.

It is a further objective of this invention to provide a tandem seat that is adaptable to a large number of ultra light aircraft manufacturers.

It is yet a further object of this invention to provide a tandem seat assembly for an ultra light aircraft that is interchangeable and removable with a single seat.

It is another object of the invention to allow a passenger to fly in an ultra light aircraft with the pilot, with minimal increase in drag forces.

Briefly, in accordance with the invention, there is provided a tandem seat assembly for an ultra light aircraft having a tandem seat frame designed to hold the two seats in close proximity to each other. Partial aerodynamic control is provided by a control stick attached to the seat frame. The single seat must be interchangeable with and removable from the aircraft. The tandem seat frame may be attached to the aircraft frame by a universal attachment in order to accommodate a number of different ultra light aircraft.

BRIEF DESCRIPTION OF THE DRAWINGS

FIG. 4 is a front view of a typical ultra light aircraft showing a single seat in position between the tubular members.

FIG. 5 is a side view of a typical ultra light aircraft showing the frame construction and a single seat positioned on the tubular members.

FIG. 6 shows an attaching means between the removable tandem seat assembly frame and the ultra light aircraft frame.

FIG. 7 shows an alternate attaching means between the removable tandem seat assembly frame and the ultra light aircraft frame.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE PREFERRED EMBODIMENT

Figure 1:
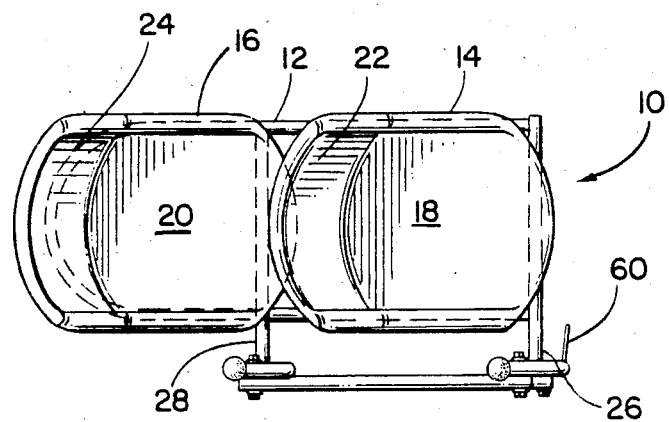
FIG. 1 is a top view of a tandem seat assembly and a control assembly.

Referring now to FIG. 1, generally indicated by 10, there is shown a tandem seat assembly that can be fastened in place on an ultra light aircraft frame once the single seat is removed. The tandem seat assembly 10 is comprised of seat frame 12, front seat 14 and rear seat 16. Front seat 14 and rear seat 16 are usually attached to frame 12 by bolts (not shown). The head of the bolts are oval and can be placed in the plan of the seat while the bolts extend through from 12 and secured by a nut. The nuts securing the bolts are shown as 17, 19, 21 and 23 in FIG. 2. Both the front seat 14 and the rear seat 16 have a bottom portion 18 and 20, respectively and a back portion 22 and 24, respectively as seen in FIGS. 1 and 2, seats 14 and 16 are representative of bucket type seats.

Figure 2:
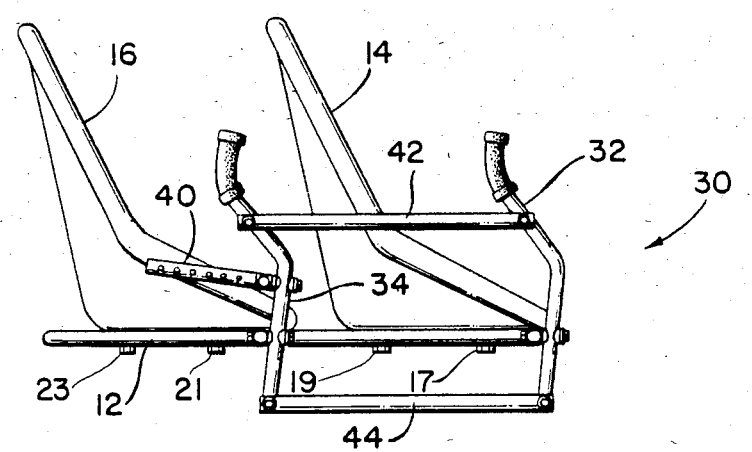
FIG. 2 is a side view of a tandem seat assembly and a control assembly.
Figure 3:
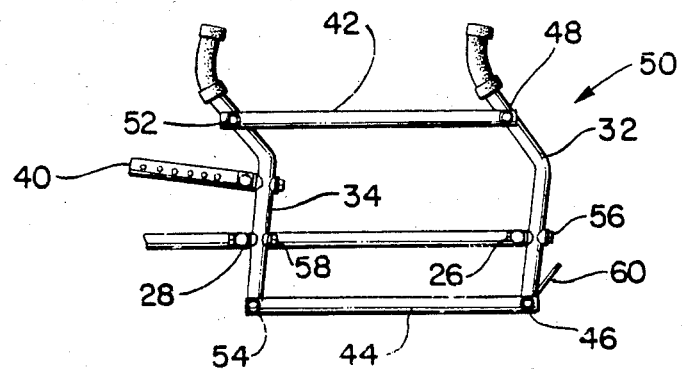
FIG. 3 is a side view of the control assembly.

FIG. 2 generally indicated by 30 shows a side view of the tandem seat assembly 10 with a dual control assembly generally indicated by 50 in FIG. 3. The control assembly 50 is attached to seat frame assembly 10 by tubular members 26 and 28. The control stick 32 and 34 are connected through cabling devices (not shown) to the aerodynamic controls of the ultra light aircraft. The control assembly 50 rotates around the tubes 26 and 28 such that push rod 40 takes on a translating motion. Push rod 40 is connected to a sheathed cable (not shown) that is connected to a control surface. The surface activated by push rod 40 controls the up and down or pitch motion of an ultra light aircraft. The control assembly also rotates about pins 56 and 58 such that push rod 60 takes on a translating motion. Push rod 60 is connected to a sheathed cable (not shown) that is also connected to a control surface. The surfaces activated by push rod 60 control the roll motion of the ultra light aircraft. The bars 43 and 44 keep control sticks 32 and 34 always in a parallel position by rotating about pins 46, 48 52 and 54. The preferred embodiment shown in FIGS. 1 and 2 is limited to dual control of pitch and roll. The directional control and the throttle control remains as in the single seat configuration. Therefore, only the front seat of the tandem seat contains all the elements of control. This will allow an instructor to teach a student sitting in the back seat the basic elements of flying. In addition, when the student is advanced and is sitting in the front seat, there are sufficient controls in the back seat of the tandem seat for the instructor to correct any serious flying problems that the student may incur.

FIG. 4 shows the front view of a typical ultra light aircraft single seat configuration generally shown as 70 with tubular member 72, 74 and 76 and single seat 78.

FIG. 5 shows a side view of a typical ultra light aircraft generally shown as 80 with tubular members 82 and 84 and single seat 86.

In order to install the tandem seat as described in 10 and 30 in an ultra light aircraft as shown in 70 and 80, the single seat 78 and 86 cannot be welded or brazed to the tubular frame 84 and 82 of the ultra light aircraft 70 and 80. The single seat 78 and 86 is, therefore, removed after the fastening devices are removed. The center of the seat 86 as shown in 80 is originally placed substantially near the center of gravity of the ultra light aircraft. This point is marked prior to removing the single seat.

The center of gravity of the tandem seat is approximately at the front edge of the rear seat 20. This should be aligned with the center of gravity of the single seat configuraton 86 which was previously marked.

The control stick 85 which is usually detachable by fastening means at the base is removed. The sheathed cables that control aircraft pitch and roll are also disconnected. The tandem seat 10 or 30 as described in the present invention can now be installed in the ultra light aircraft. If the width of tubular frame member 12 substantially aligns with the width of the tubular frame 84, the fastening means as described in FIG. 7 shown as 120 can be used. Alignment of the tandem seat frame 124 with the tubular aircraft frame 122 is required prior to drilling holes in the tandem seat frame 124 to match the existing holes in the tubular aircraft frame 122. The holes in tubular aircraft frame 122 result from the single seat fastening means. Once the holes are drilled, bolt 126 is placed in the drilled holes and nut 128 is securely tightened. If the tubular frame 12 of tandem seat 30 does not align with aircraft frame 84, fastening means shown in FIG. 6 indicated by 90 can be used. The clamps 90 are positioned such that serations 94 in clamp 90 grip the aircraft tubular frame 84 while serations 92 in clamp 90 grip the tandem seat tubular 92. The nuts 96 and 98 are tightened while holding firm bolt heads 100 and 102 until the clamp 90 is completely secure.

The directional controls and the throttle controls are in the same position as for the single seat configuration. These controls are reached by the person sitting in the front seat 18. After the seat frame 12 has been attached to the aircraft frame 84, the pitch control push rod 40 and the roll control push rod 60 is connected to their respective sheathed cables.

After the instruction period, when the instructor believes the student is ready for a solo, the reverse procedure from that described above converts the ultra light aircraft 70 and 80 back to a single seat configuration.

What is claimed is:

1. A tandem seat assembly for installation in an ultralight aircraft having a single removable seat attached to an ultralight aircraft frame, comprising:
   a tandem seat assembly frame;
   a first bucket seat including a bottom and a back, said first bucket seat fitted to said tandem seat assembly frame;
   means to connect said first bucket seat to said tandem seat assembly frame;
   a second bucket seat including a bottom and a back, said second bucket seat located behind and in close proximity to said first bucket seat, said second bucket seat fitted to said tandem seat assembly frame;
   means to connect said second bucket seat to said tandem seat assembly frame;
   dual control means connected to said tandem seat assembly for controlling said ultralight aircraft in pitch and roll; and
   means for connecting said tandem seat assembly frame with said first and said second bucket seats and said dual control system attached to said ultralight aircraft frame.

2. A tandem seat assembly as described in claim 1 wherein said tandem seat assembly is interchangeable with and will fit into the same space occupied by said removable single seat in said ultralight aircraft without structural modification to said ultralight aircraft.

3. A tandem seat assembly as described in claim 1 wherein said tandem seat assembly center of gravity is placed near the nominal center of gravity of said ultralight aircraft.

4. A tandem seat assembly as described in claim 1 wherein the addition of said tandem seat assembly to said ultralight aircraft does not increase the weight empty of said ultralight aircraft above 254 pounds.

5. A method for converting a single seat ultralight aircraft into a tandem seat ultralight aircraft comprising:

removing said single seat from said ultralight aircraft frame;

providing a tandem seat assembly frame to fit on the frame of said ultralight aircraft;

fastening a first bucket seat and a second bucket seat to said tandem seat assembly frame, said second bucket seat being placed behind and in close proximity to said first bucket seat;

providing dual control means attached to said tandem seat assembly; and attaching said tandem seat assembly to said ultralight aircraft frame.

6. A method as described in claim 5 wherein said dual control means provide only pitch and roll control.

7. A method as described in claim 5 wherein the addition of said tandem seat assembly does not increase the empty weight of said ultralight aircraft above 254 pounds.

* * * * *